US006801514B2

(12) United States Patent
Ma

(10) Patent No.: US 6,801,514 B2
(45) Date of Patent: Oct. 5, 2004

(54) NON-SDMA SYSTEM WITH AN SDMA METHOD

(75) Inventor: Ching-Wen Ma, Chia I Hsien (TW)

(73) Assignee: BenQ Corporation, Tao-Yuan Hsien (TW)

( * ) Notice: Subject to any disclaimer, the term of this patent is extended or adjusted under 35 U.S.C. 154(b) by 807 days.

(21) Appl. No.: 09/777,017

(22) Filed: Feb. 6, 2001

(65) Prior Publication Data

US 2001/0012278 A1 Aug. 9, 2001

(30) Foreign Application Priority Data

Feb. 3, 2000 (TW) ........................................ 89101922 A

(51) Int. Cl.[7] .................................................. H04H 1/00
(52) U.S. Cl. ..................................... 370/339; 455/562
(58) Field of Search ................................. 370/310, 312, 370/328, 334, 339, 343, 252, 535; 455/422, 423, 456, 451, 19, 25, 67.1, 560, 561, 562, 101.2

(56) References Cited

U.S. PATENT DOCUMENTS

| 5,508,707 | A | | 4/1996 | LeBlanc et al. |
| 6,240,098 | B1 | | 5/2001 | Thibault et al. |
| 6,470,195 | B1 | * | 10/2002 | Meyer ..................... 455/562.1 |
| 6,701,165 | B1 | * | 3/2004 | Ho et al. ................. 455/562.1 |

FOREIGN PATENT DOCUMENTS

| EP | 0926912 A2 | 6/1999 |
| GB | 2309616 A | 7/1997 |
| WO | WO 98/28864 A1 | 7/1998 |
| WO | WO 98/30047 A1 | 7/1998 |
| WO | WO 98/39945 A1 | 9/1998 |
| WO | WO 98/54851 A2 | 12/1998 |

* cited by examiner

*Primary Examiner*—David Vincent
(74) *Attorney, Agent, or Firm*—Winston Hsu

(57) ABSTRACT

A communications system providing SDMA communication channels in a non-SDMA (non-spatial division multiple access) system and used in a specific area to establish wireless communications with mobile stations in the area comprises a smart antenna to establish wireless communications with the mobile stations, a base station controller managing transmissions and receiving information between every mobile station and an outgoing communications network, a plurality of base transceiver stations electrically connected with the base station controller, each of them establishing the wireless communications between the mobile stations and the base station controller, and a spatial spectrum management system connected between the smart antenna and the base transceiver stations. The spatial spectrum management system uses the spatial spectrum from the smart antenna and chooses a set of communication channels from a plurality of communication channels according to the position of every mobile station to establish the wireless communications with mobile stations in the communication area.

20 Claims, 9 Drawing Sheets

NON-SDMA SYSTEM WITH AN SDMA METHOD

BACKGROUND OF THE INVENTION

1. Field of the Invention

The present invention provides a communications system and method. Specifically, a system and a method is disclosed that provides SDMA (spatial division multiple access) communication channels in a non-SDMA system. The present invention utilizes a smart antenna that takes advantage of the same communication channel to emit a plurality of spatial spectrums. The spatial spectrums are used to transmit information and establish wireless communications with a plurality of mobile stations at different positions. The present invention uses the limited numbers of communication channels efficiently without lowering the communication quality.

2. Description of Prior Art

Please refer to FIG. 1. FIG. 1 is a schematic diagram of a prior art wireless communications system 10. The wireless communications system 10 is located in a communications area 12, which is one of a plurality of such communications areas (not shown). The system 10 effects wireless communications with mobile stations, such as a mobile phone 14. The wireless communications system 10 includes an omnidirectional antenna 16 that emits wireless signals in every direction, a base transceiver station (BTS) 18, and a base station controller (BSC) 20. The base station controller 20 controls the transmitting and receiving of information between the mobile phone 14 in the specific communications area 12 and other communications networks. The base transceiver station 18 is connected with the base station controller 20 and effects the wireless communications between one or many mobile phones and the base station controller 20. Because the omnidirectional antenna 16 emits wireless signals in every direction, that is the signals are non-directional, many mobile phones must use different wireless communication channels to prevent interference between them if they try to simultaneously establish wireless communications with the base station controller 20. But the number of wireless communication channels is limited in the wireless communications system 10, especially in a multi-user communications system, and so increasing the number of users or providing a higher quality of communications service cannot be done because of interference conditions. For example, if the wireless communications system 10 is designed to use thirty sets of predetermined communication channels in the communications area 12, it can establish wireless communications with at most thirty users. Other communications areas near the communications area 12 must not use these thirty sets of communication channels to prevent interference. So, the reuse efficiency of the communication channels is limited and cannot be improved.

Please refer to FIG. 2. FIG. 2 is a schematic diagram of another prior art wireless communications system 30. The wireless communications system 30 includes a group of antennas or a plurality of antennas 32, 34, and 36, a plurality of corresponding base transceiver stations 52, 54, and 56, and a base station controller 60. Wireless communications for a communications area 28 is effected by the wireless communications system 30, and is partitioned into different communications sectors 22, 24, and 26 in advance. Antennas corresponding to each communications sector are responsible for transmitting and receiving wireless information transmitted to the base station controller 60 by the corresponding base transceiver stations. For example, every base transceiver station has ten sets of communication channels if the communications area 28 is designed to use thirty predetermined sets of communication channels. As discussed above, the base transceiver station 52 can support the wireless communications of ten mobile phones in its territory, as can the base transceiver stations 54 and 56. Hence, thirty mobile phones are available at the same time, and the reuse efficiency of the wireless communications system 30 is better than that of the wireless communications system 10. But the wireless communications system 30 has to set up more base transceiver stations like 52, 54, and 56, and so the overall cost of the system 30 is increased. Furthermore, because wireless communications between different users is achieved by using different communication channels, the reuse efficiency of the wireless communication channels cannot fulfill more and more communications demands.

An SDMA (spatial division multiple access) wireless communications system including a smart antenna, one or a plurality of base transceiver stations, and a base station controller, has been proposed to solve the problems discussed above. The smart antenna is used to transmit and receive directional wireless signals, and establishes wireless communications with users in a specific area. The base transceiver station and the base station controller include software and hardware equipment for SDMA. Because the SDMA wireless communications system can handle directional wireless signals from mobile phones and recognize their position, its reuse efficiency of communication channels is greatly improved. U.S. Pat. No. 5,886,988 has also proposed a method for improving the software procedure in the base transceiver station and improving the communications quality. Not every wireless communications system is SDMA, however, and it costs a lot to change the original system to an SDMA system.

SUMMARY OF THE INVENTION

The present invention provides SDMA communication channels for a non-SDMA wireless communications system. When a plurality of mobile stations in different positions try to establish wireless communications, the mobile stations also use the same communication channels with different direction information for recognizing and achieving the goal of high reusability for the original communication channels, with a lower cost.

DETAILED DESCRIPTION OF THE PREFERRED EMBODIMENT

Figure 1:
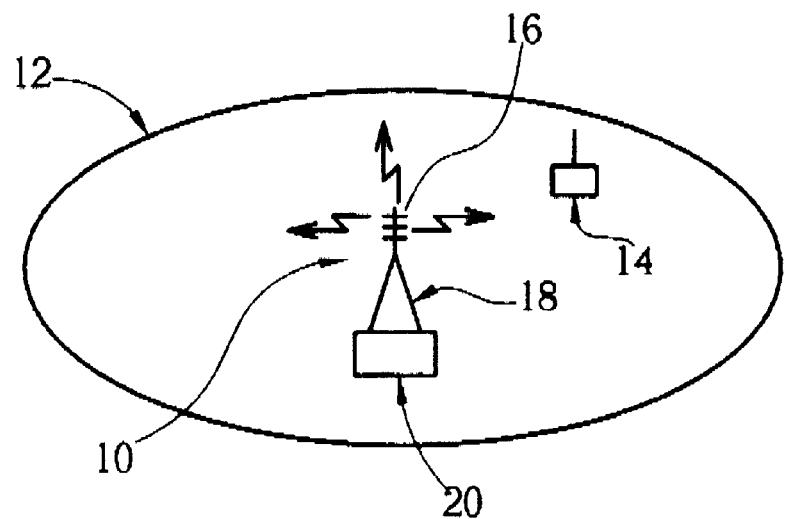
FIG. 1 is a schematic diagram of a prior art wireless communication system.
Figure 2:
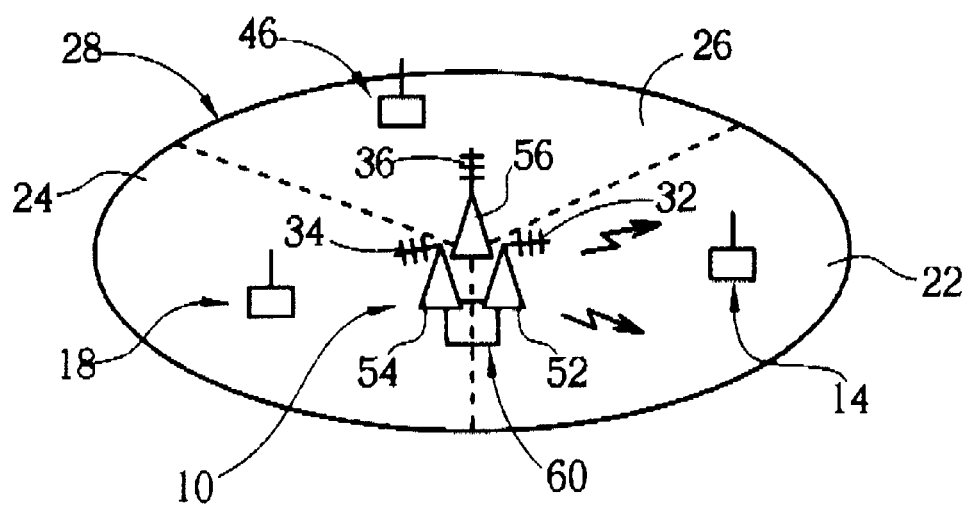
FIG. 2 is a schematic diagram of another prior art wireless communication system.
Figure 3:
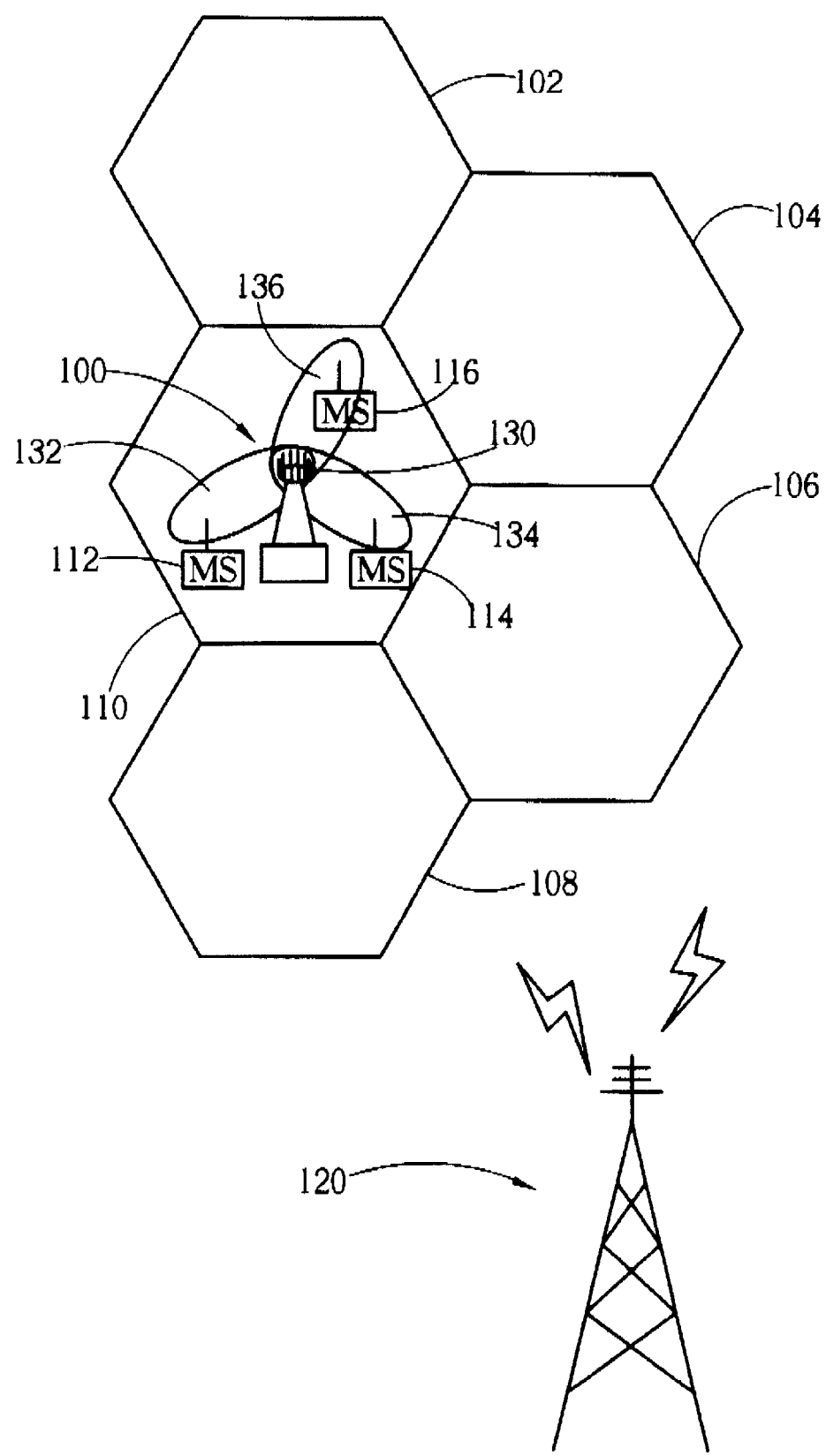
FIG. 3 is a schematic diagram of the present invention wireless communication system.

Please refer to FIG. 3. FIG. 3 is a schematic diagram of a present invention wireless communications system 100.

The wireless communications system 100 is in a specific communications area 110, which is one of a plurality of communications areas 102, 104, 106, 108, and 110, and establishes wireless communications with mobile stations in the specific area 110. The communications areas 102, 104, 106, 108, and 110 are similar cells that use a specific method of frequency planning, and the mobile stations are, for example, mobile phones 112, 114, and 116 transmitting and receiving information with an outgoing communications network 120 via the wireless communications system 100. The mobile phones can establish wireless communications in the same communications area 110, or between different communications areas like 102, 104, 106 or 108.

Figure 4:
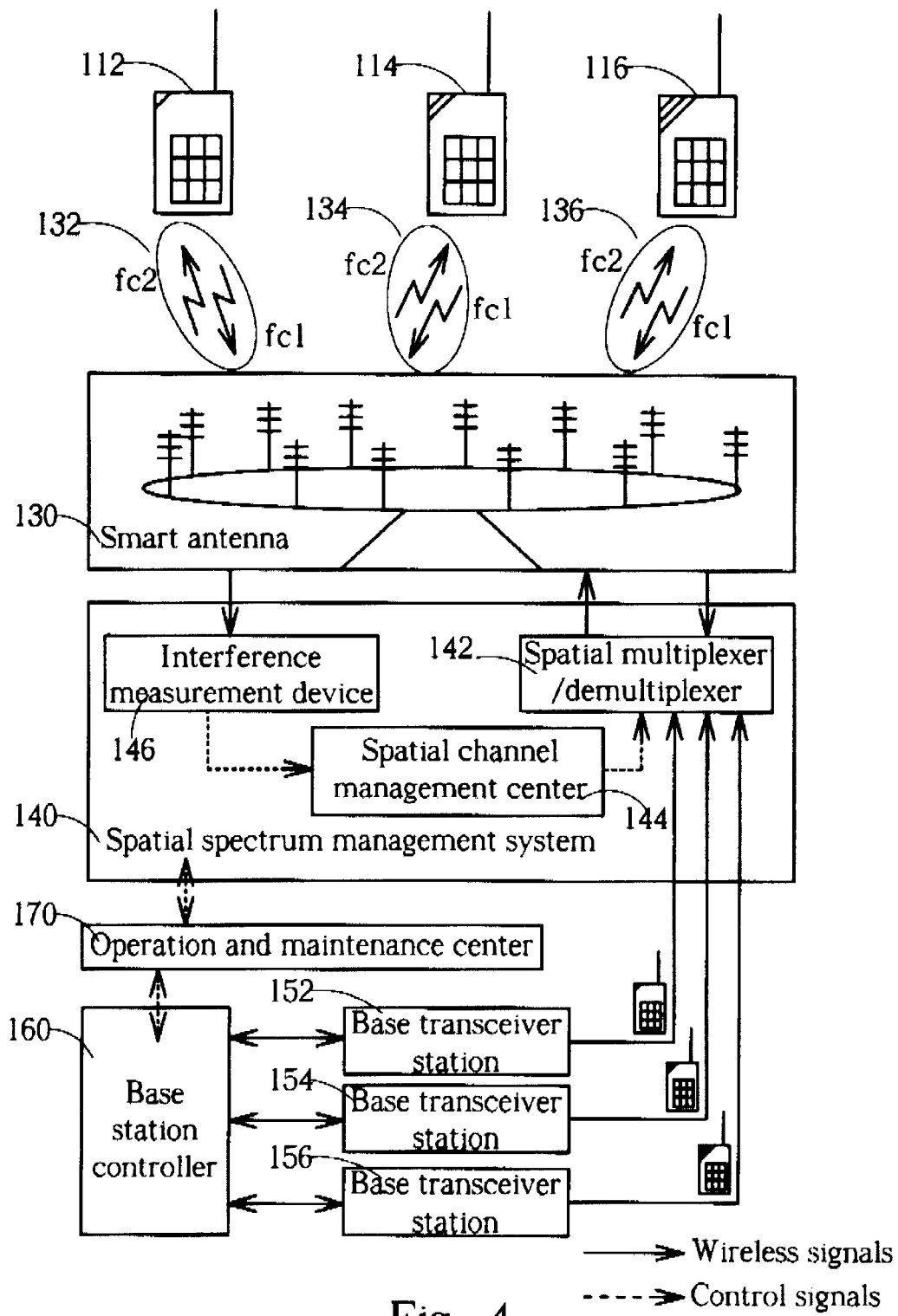
FIG. 4 is a block diagram of the present invention wireless communication system.

Please refer to FIG. 4. FIG. 4 is a block diagram of one embodiment according to the present invention wireless communications system 100. The wireless communications system 100 includes a smart antenna 130, a spatial spectrum management system 140, a plurality of base transceiver stations 152, 154, and 156, a base station controller 160, and an operation and maintenance center 170. The smart antenna 130 can be a switched-beam smart antenna, as disclosed in U.S. Pat. No. 5,745,841, or an adaptive-array smart antenna, as disclosed in U.S. Pat. No. 5,886,988.

The smart antenna 130 takes advantage of the spatial spectrums 132, 134, and 136 transmitted or received by itself to effect wireless communications with the mobile phones 112, 114 and 116 in the specific communications area 110. The base station controller is used to control the transmitting and receiving of information between the mobile phones 112, 114, or 116 in the specific communications area 110 and the outgoing communications network 120. The base transceiver stations 152, 154, and 156 are electrically connected with the base station controller 160. Every base transceiver station simultaneously establishes wireless communications between one or many mobile phones and the base station controller 160. The de facto number of clients serviced depends upon the number of clients using the communication channels, the initial limitations of the base transceiver stations, and whether or not the quality of communication is lowered by interference. The spatial spectrum management system 140 is connected between the smart antenna 130 and the base transceiver stations 152, 154, and 156, and effects wireless communications with the mobile phones 112, 114, and 116 in the specific communications area 110. The spatial spectrum management system 140 selects a set communication channels from a plurality of sets of predetermined communication channels to establish wireless communications with the mobile phones according to their position. When the spatial spectrum management system 140 establishes wireless communications with a mobile phone 112 via the smart antenna 130, for example, it also selects a set of uplink and downlink channels fc1 and fc2 to be the carriers of the wireless information. The operation and maintenance center 170 communicates with the spatial spectrum management system 140 and the base station controller 160 to provide the spatial spectrum management system 140 with the wireless communication channels in use by different base transceiver stations, and to participate with the base station controller 160 about the assignments and adjustments of the wireless communication channels. The different sets of communication channels can be partitioned by their frequencies, time slots, pseudo codes, or by a combination of frequencies, time slots, and pseudo codes.

The spatial spectrum management system 140 includes a spatial multiplexer/demultiplexer 142, a spatial channel management center 144, and an interference measurement device 146. The spatial multiplexer/demultiplexer connected to the smart antenna 130 transmits smart antenna 130 information received in every direction from mobile phones 112, 114, and 116 to corresponding base transceiver stations 152, 154, and 156. The spatial channel management center 144 is used to control the spatial multiplexer/demultiplexer to assign appropriate communication channels respectively to the mobile phones 112, 114, and 116 to try to establish wireless communications. The interference measurement device 146 determines if there is information interference with the mobile phones 112, 114, and 116 according to the spatial spectrums 132, 134, and 136 received by the smart antenna 130, and transmits an index to the spatial channel management center 144. When the spatial channel management center 144 receives the index from the interference measurement device 146, it can determine whether or not interference exists between the different spatial spectrums 132, 134, and 136 according to the value of the index, and then determine if the mobile phones with interference should be transferred to other channels.

Figure 5:
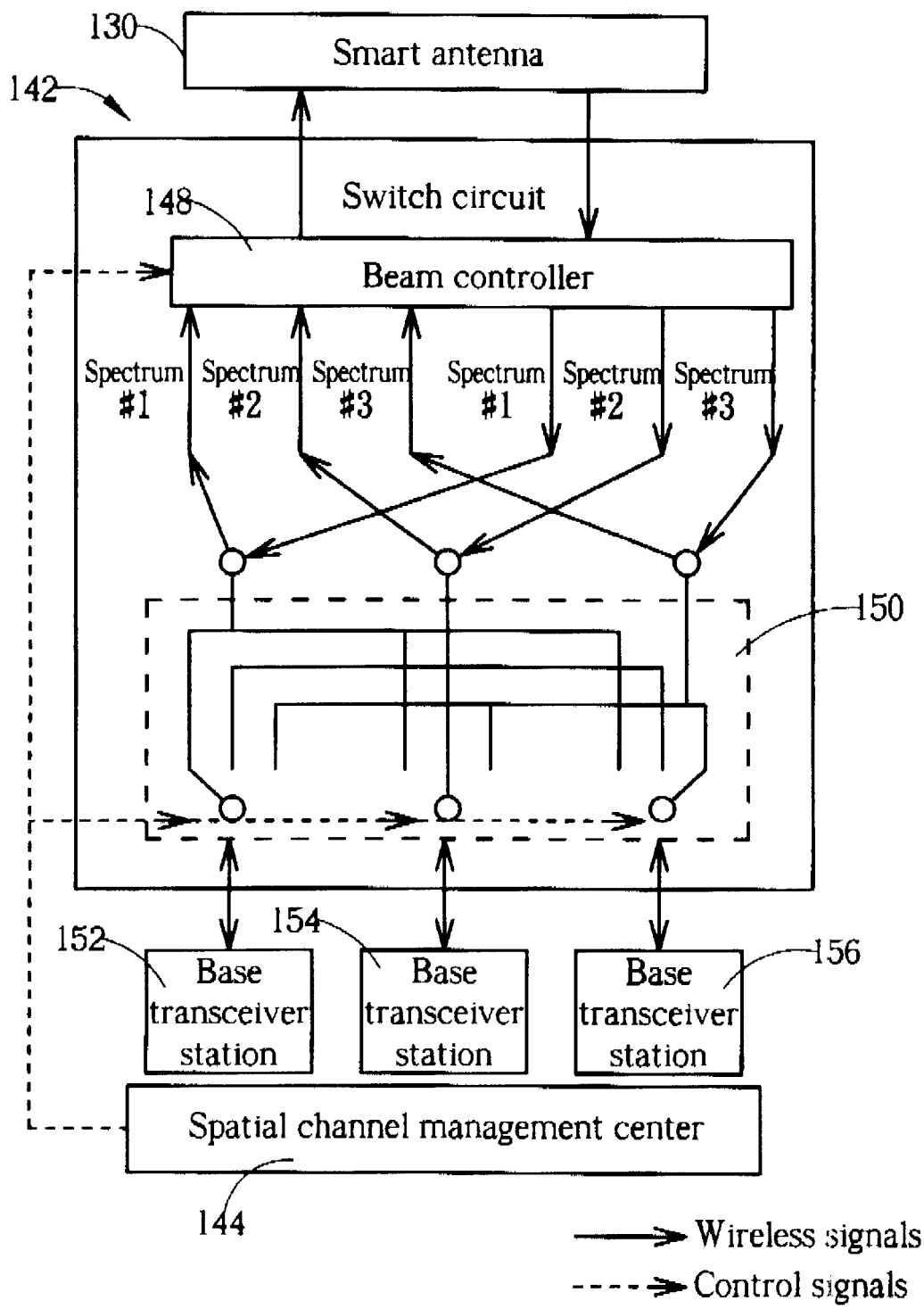
FIG. 5 is a schematic diagram of a spatial multiplexer/demultiplexer in the present invention wireless communication system.

Please refer to FIG. 5. FIG. 5 is a schematic diagram of the spatial multiplexer/demultiplexer 142 in the present invention wireless communications system 100. The spatial multiplexer/demultiplexer 142 also includes a beam controller 148 and a switch circuit 150, both controlled by the spatial channel management center 144. The beam controller 148 is connected to the smart antenna 130 and controls the spatial spectrums 132, 134, and 136 from the smart antenna 130, and dynamically traces the positions of every mobile phone 112, 114 and 116 in the specific communications area 110. The switch circuit 150, controlled by the spatial channel management center 144, effects wireless communications between the base station controller 160 and the mobile phones 112, 114 and 116 via the same or different base transceiver stations.

When mobile phones in different positions 112, 114 or 116 in the specific area 110 try to establish wireless communications at the same time, the spatial spectrum management system 140 controls the smart antenna 130 to emit spatial spectrums 132, 134, or 136 without information interference to effect the wireless communications with the mobile phones 112, 114 or 116. The spatial spectrums 132, 134 or 136 use the same set communication channels fc1, fc2 to transmit information, as shown in FIG. 4. Each of these spectrums includes spatial information that represents the positions within the area 110, and so the spatial spectrums 132, 134 and 136 can be differentiated and so are not confused. When mobile phones 112, 114, or 116 transmit and receive wireless information via the same set of communication channels, the spatial spectrum management system 140 establishes the wireless communications between the base station controller 160 and the mobile phones 112, 114 and 116 via the different base transceiver stations 152, 154, and 156. Because the base transceiver stations 152, 154 and 156 have their respective identification codes, even when the mobile phones 112, 114, or 116 transmit wireless information using the same set of communication channels the base station controller 160 can still tell them apart.

Because users of mobile phones move their positions casually, wireless communications with the smart antenna 130 can be interfered with when the mobile phones 112, 114, or 116 move to approximately the same position. Transmitting wireless information using the same set of communication channels at this point will be futile. As a result, the spatial spectrum management system 140 uses the smart antenna 130 to emit spatial spectrums using different communication channels, and continues the wireless communications with the mobile phones 112, 114 or 116.

For example, a user in the specific area 110 of the wireless communications system 100 tries to use the mobile phone 112 to establish wireless communications, and dials a number at his current position. The wireless communications system 100 effects the wireless communications with the mobile phone 112 by setting a spatial spectrum 132 with the smart antenna 130, The wireless information in the spatial spectrum 132 is also transmitted to the spatial multiplexer/demultiplexer 142 and interference measurement device 146 of the spatial spectrum management system 140. The spatial multiplexer/demultiplexer 142 demodulates the wireless information and recognizes the spatial information representing the position of the user in it, and the spatial spectrum 132 also can adjust and track the de facto position of the mobile phone 112. There are many ways to track the accurate position of the mobile phone 112, which are related to the type of the smart antenna 130 used. If the smart antenna 130 is a switched-beam smart antenna, please refer to U.S. Pat. No. 5,745,841; if it is an adaptive-array smart antenna, please refer to U.S. Pat. No. 5,886,988.

The interference measurement device 146 analyzes the wireless information and transmits the index to the spatial channel management center 144 to indicate the quality of communications at this point. The index, for example, can be the bit error rate usually used in a communications system. If the quality of communications has dropped below a specific standard, the spatial channel management center 144 changes communication channels like fc1 and fc2 used by the spatial spectrum 132 and assigns to it other interference-free communication channels, like fc3 and fc4. The spatial management center 144 can also change the time slot or pseudo code. The spatial channel management center 144 can use the index from the interference measurement device 146 to recognize inference between the smart antenna 130 and the mobile phones caused by the mobile phones changing their positions, and re-assign the communication channels for the spatial spectrum 132.

Figure 6:
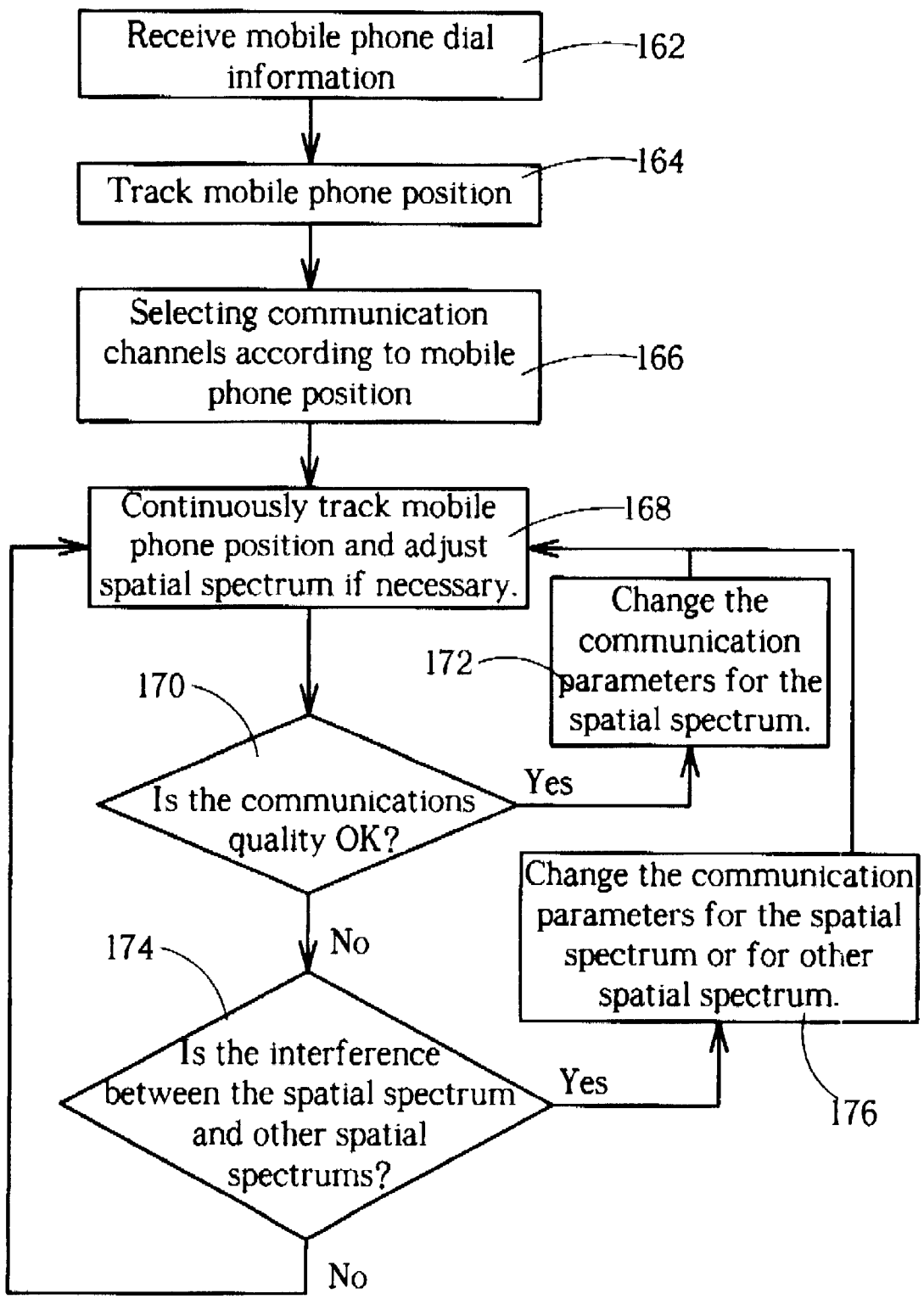
FIG. 6 is a control flow-chart of a present invention spatial channel management center.

Please refer to FIG. 6. FIG. 6 is a control flow chart of the present invention spatial channel management center 144.

Step 162: Receiving the dial information of the mobile phone 112.

Step 164: Using the spatial spectrum transmitted or received by the smart antenna 130 to track the position of the mobile phone 112 in the specific communication area 110.

Step 166: Selecting a set of communication channels from a plurality of predetermined communication channels to establish wireless communications with the mobile phone 112 according to its position.

Step 168: Tracking the position of the mobile phone 112 continuously according to the spatial spectrum 132 and changing the spatial spectrum 132 if necessary.

Step 170: Determining if the communications quality is below a specific standard. If yes, go to step 172. If no, go to step 174.

Step 172: Changing the communication channels for the spatial spectrum 132. For example, changing the frequency, time slot, or pseudo code, then proceed to step 168.

Step 174: Determining if there is interference between the spatial spectrum 132 and other spatial spectrums. If yes, go to step 176. If no, go to step 168.

Step 176: Changing the communication channels for the spatial spectrum 132 or other spatial spectrums. For example, changing the frequency, time slot, or pseudo code, then proceed to step 168.

Please refer to from FIG. 7 to FIG. 14. FIG. 7 to FIG. 14 are schematic diagrams of establishing wireless communications between the present invention communications system 100 and mobile the phones 112 and 114. The wireless communications system 100 includes a base station controller 160, base transceiver stations 152, 154 and 156, a smart antenna 130, and a spatial spectrum management system 140. The task can be partitioned into the four following sequences.

1. Broadcasting information
2. Establishing wireless communications (audio, data, or a combination of audio and data)
3. Maintaining the condition of the wireless communication channels
4. Terminating the wireless communications The communication channels are the wireless transmitting means between the base transceiver station and mobile phones. The wireless communication channels can be divided by different frequencies, different time slots, or different codings. The wireless communication channels are used in broadcasting system information, effecting communications, and transmitting audio and digital information. The advantage of the present invention is to provide a mechanism for maintaining the condition of communication channels, especially those used for telecommunications. It sets base transceiver stations 152, 154, and 156 to use spatial spectrums with different directions and the same communication channels to achieve the goal of increasing the capacity of the wireless communications system.

For example, if there are thirty wireless communication channels available, the method used in the prior art assigned them to the base transceiver stations 52, 54, and 56 so that each of them has 10 communication channels. The territory belonging to the base transceiver station 52 permitted 10 mobile phones to communicate at the same time, as did the base transceiver stations 54 and 56. In other words, a total of thirty mobile phones could communicate at the same time. The advantage of the present invention is that a wireless communication channel for telecommunications can be used by the base transceiver stations 152, 154, and 156 at the same time, and thus up to ninety mobile phones can communicate at the same time, under best conditions.

First, the smart antenna broadcasts system information to all communications areas so that mobile phones in these areas can register with the wireless communications system 100. Mobile phones that complete the registration process can then ask the wireless communications system 100 for service, and the wireless communications system 100 can also call mobile phones that have completed the registration process. This part of the present invention can be designed by reference to the prior art. One method applied in the prior art is a broadcasting of system information to all areas via the control communication channels carrying them. Another method applied in the other prior art is broadcasting system information to three smaller areas via three control communication channels, and the three smaller areas compose a whole geographical area. The present invention exchanges the three sets of smaller area antennas in the prior art for a smart antenna, and the base transceiver stations 52, 54, and 56 keep their functionality as base transceiver stations 152, 154, and 156. System information from them can be connected to the smart antenna 130 via three control communication channels. There are at least three ways for the smart antenna to broadcast system information to all areas:

1. Broadcasting system information from one of the base transceiver stations to all areas, system information from others not being broadcasted.

2. Broadcasting all system information to all areas.
3. Broadcasting three sets of system information from three base transceiver stations to three sub areas.

Figure 7:
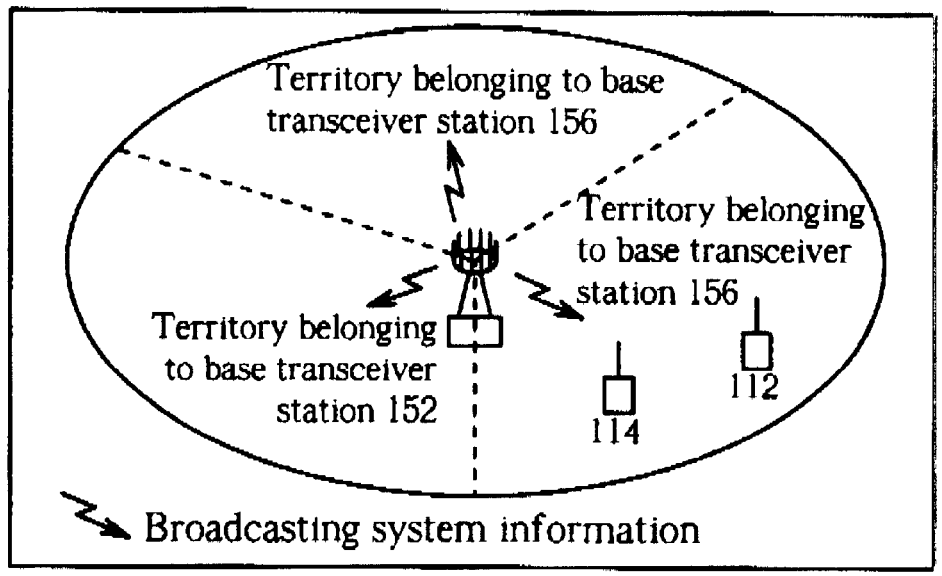
FIG. 7 to FIG. 14 are schematic diagrams of establishing wireless communications between the wireless communication system and mobile phones.

Each method mentioned above can achieve the goal of broadcasting system information, but broadcasting to three sub areas described in method 3 results in less interference than method 1 and method 2. Taking an example for method 3, a smart antenna 130 broadcasts three sets of system information to three sub areas via three sets of control wireless communication channels carrying them, as shown in FIG. 7. In FIG. 7, mobile phones 112 and 114 are in the area covered by base transceiver station 154, and they register with the wireless communications system 100 via the base transceiver station 154. Under the condition that wireless channels from C01 to C30 are available, base transceiver stations 152, 154 and 156 have the authority to use the wireless channels from C01 to C30.

The second procedure is establishing wireless communications between the control wireless channels broadcasting system information and those that are unused. This procedure can be divided into three sub procedures of calling, negotiating, and starting communications. When mobile phones ask for a communication service, they also emit signals to call the base transceiver stations. When the wireless communications system 100 asks for a communication service, the base transceiver stations emit signals to call the mobile phones. They then negotiate the rights for users and the wireless channels for communications. Finally, they communicate via the communication channels that were achieved by negotiation. The procedure of calling and negotiating can use the same control wireless channel for broadcasting system information. The smart antenna can determine the position of the mobile phones at any of the three sub procedures. To ensure that the present invention is viable, the position information of mobile phones is not used during the registration process. It is known, however, that in the areas in which the mobile phones register, the transmitting and receiving range of all wireless channels must be the same in the registration area to ensure that the base transceiver stations and mobile phones can communicate with each other. And because the wireless channels for telecommunication are set to be reused, the wireless channels have to be unused in the area during this procedure to prevent interference.

Figure 8:
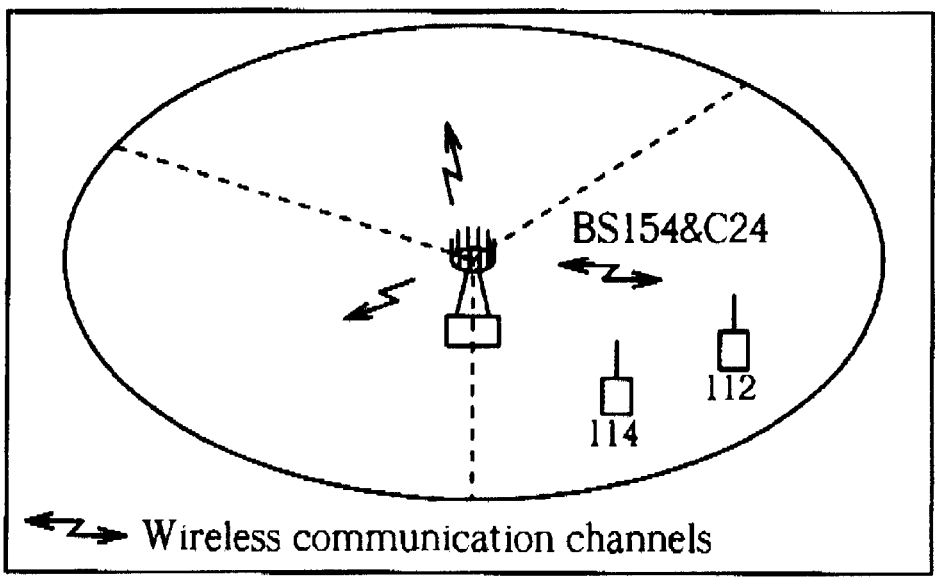

If thirty wireless channels are available, base transceiver stations 152, 154, and 156 have the authority to use these wireless channels. The spatial spectrum management system 140 can request the use of the wireless channels of all the base transceiver stations from the OMC (Operation and Maintenance Center) and request the transmitting and receiving characteristics, like direction, angle, and range, of the wireless channels from the smart antenna 130. After the spatial spectrum management system has acquired this information, it can recognize which wireless channels are in use and where they are in use. Then, the OMC can instruct the operations of the base station controller, prohibiting corresponding base transceiver stations from using these channels for communication. For example, a user dials from the mobile phone 112, and the mobile phone 112 establishes wireless communications using an unused wireless channel in the area covered by the base transceiver station 154, as shown in FIG. 8 because it is registered with the base transceiver station 154.

Figure 9:
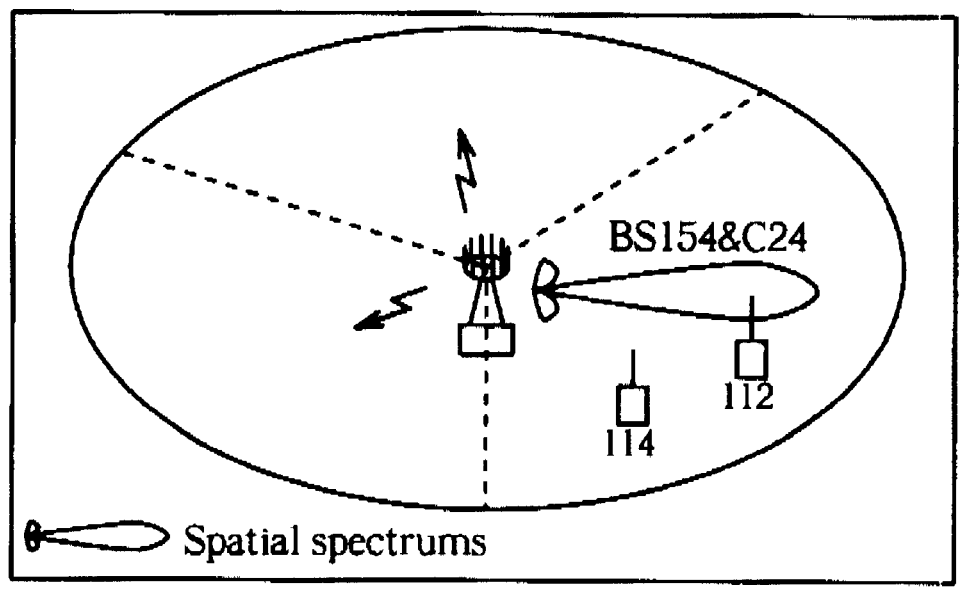
Figure 10:
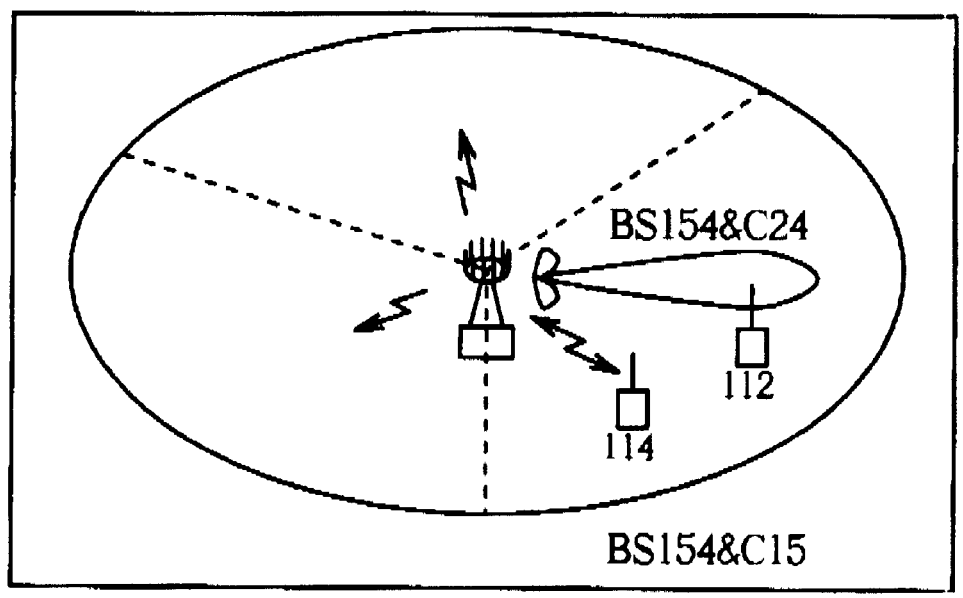
Figure 11:
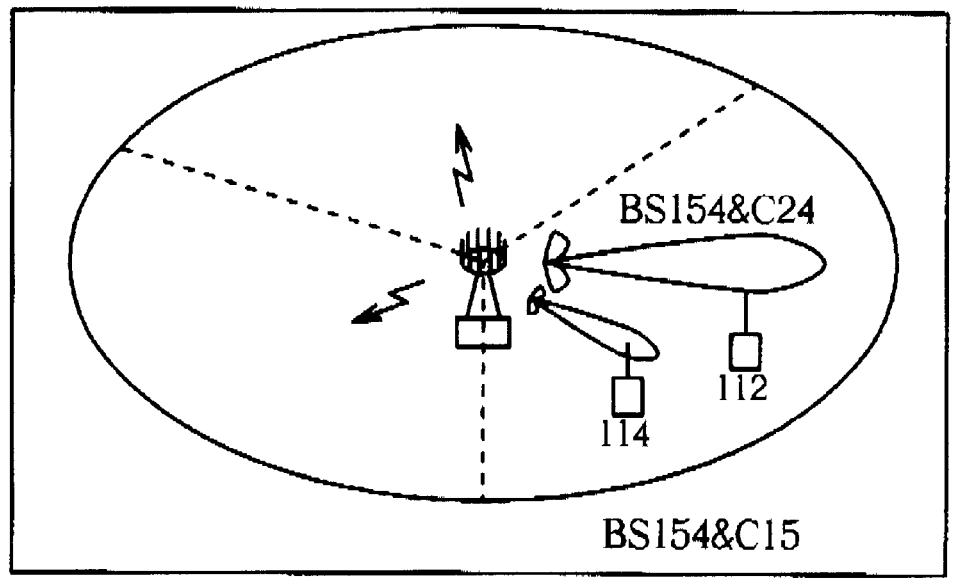

After establishing communications, or beginning communications, the smart antenna 130 can use the uplink information to recognize the position of the mobile phone 112. The spatial spectrum management system 140 then controls the smart antenna 130, forming a spatial spectrum to trace the position of the mobile phone 112. As shown in FIG. 9, mobile phones in the area covered by the base transceiver station 154 cannot use C24 for communications. This prohibition is achieved by the instruction of the OMC to the base station controller. At this time, the mobile phone 114 establishes wireless communications using an unused communication channel C15 in the area covered by the base transceiver station 154, as shown in FIG. 10, because it is registered with base transceiver station 154, Similarly, after establishing communications, or beginning communications, the smart antenna 130 uses the uplink information to recognize the position of the mobile phone 114. The spatial spectrum management system 140 then controls the smart antenna 130, forming a spatial spectrum to trace the mobile phone 114, as shown in FIG. 11.

Figure 12:
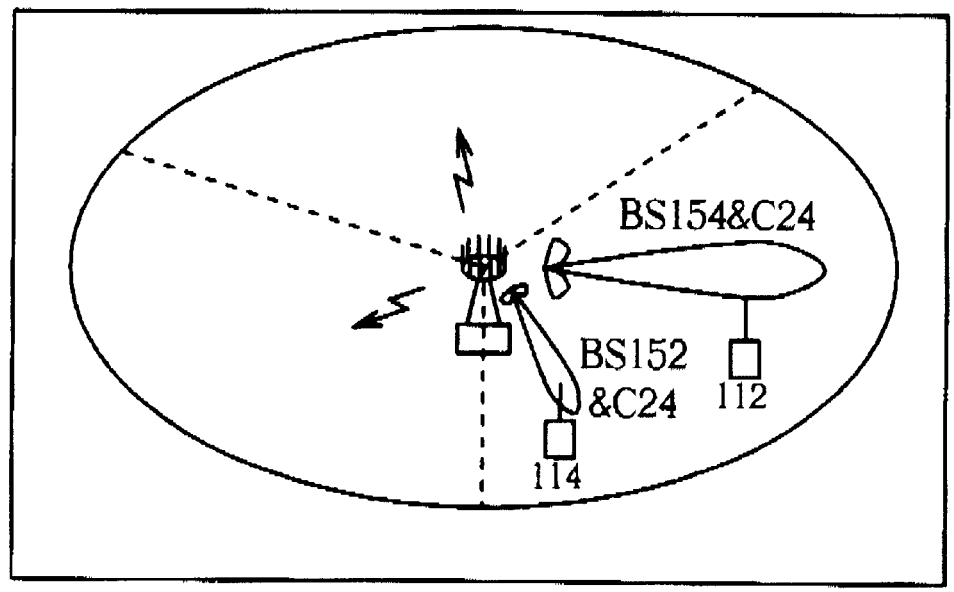
Figure 13:
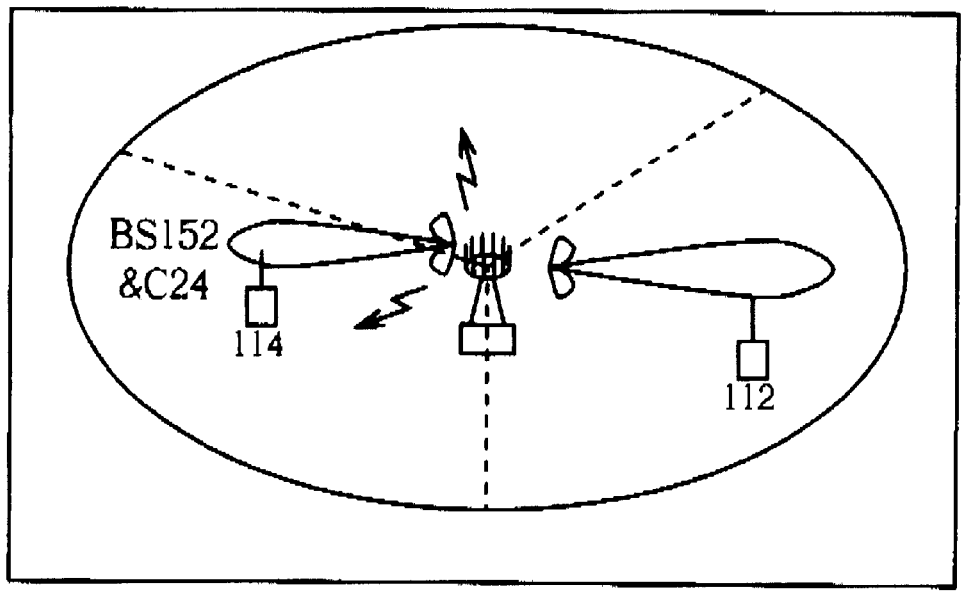
Figure 14:
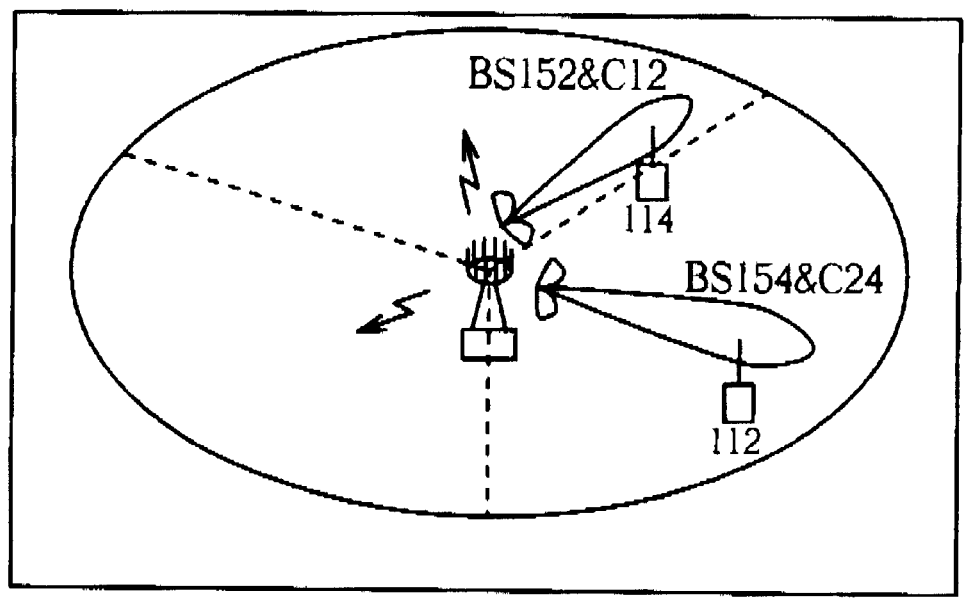

The third procedure uses the smart antenna 130 and the spatial spectrum management system 140 to provide a mechanism for maintaining the wireless channels while increasing the capacity of the communications system. During the communication procedures, the spatial multiplexer/demultiplexer 142 of the smart antenna 130 analyzes the directional characteristic of the uplink information of the communications channels in use. Because of these directional characteristics, the information can be partitioned into two parts; one part is the uplink receiving spatial spectrum, the other is the downlink transmitting spatial spectrum. Mobile phone positions are tracked using this information. The spatial spectrum management system 140 summarizes information of these spatial spectrums and the used communication channels of every base transceiver station from the OMC to determine the characteristics of the wireless communication channels in use by every mobile phone, like position and angular separation. This information is used in maintaining the condition of wireless channels in a specific area in the second procedure. In this procedure, the angle between two spatial spectrums is measured in advance. When the angle exceeds a predetermined value, and the two spatial spectrums use different wireless channels, one of two spatial spectrums is switched over to another base transceiver station and uses the same wireless channel as the first. The large angular separation between the two spatial spectrums for two corresponding mobile phones enables the use of the same wireless channel, and so the effective capacity of the communications system has been doubled. When two mobile phones use the same wireless channel and the angle between their corresponding spatial spectrums becomes smaller than a predetermined value, one of the mobile phones is switched over to a different communication channel to ensure the quality of communications. For example, when the spatial spectrum controller determines that two mobile phones 112 and 114 are not at the same position, the wireless channel C15 used by the mobile phone 114 is switched over to the wireless channel C24 used by the base transceiver station 152, as shown in FIG. 12. The same wireless channel C24 can thus be used at least two times. The mobile phone 114 keeps moving and communicating with the wireless communications system 100 via the base transceiver station 152, and the spatial spectrum of the smart antenna 130 keeps tracking it, as shown in FIG. 13. When the angle between the two spatial spectrums becomes smaller than the predetermined value, the mobile phones 114 and 112 cannot use the same wireless channel C24. When the spatial spectrum system 140 recognizes this condition, it permits the OMC to instruct the base station controller to make the mobile phone 114 or 112 switch their wireless channels. For example, the mobile phone 114 switches over to the wireless channel C12, as shown in FIG. 14.

The last procedure is terminating the wireless communications. In this procedure, the spatial spectrum management system 140 obtains the information of which wireless channel is going from a used to an unused condition from the OMC.

In summary, the spatial spectrum management system 140 has the ability to supervise and control the whole condition of the wireless channels. The supervising ability comes from the information from the OMC and the information from the smart antenna 130. The controlling ability comes from the OMC to instruct the base station controller and control the smart antenna 130 to form the spatial spectrums to track the mobile phones in use. The operation of the OMC instructing the base station controller includes prohibiting a base transceiver station from using a wireless channel to prevent interference and demanding a switching of wireless channels. With the spatial spectrum management system 140 supervising and controlling the wireless channels, the four procedures discussed above are performed to maintain the usage of wireless channels and to achieve the goal of increasing the capacity of the communications system.

Compared to the non-SDMA wireless communication system 10 and 30 of the prior art, the present invention wireless communications system 100 includes a spatial spectrum management system 140 that provides SDMA communication channels in a non-SDMA wireless communication system, When mobile phones 112, 114, and 116 are in different positions and try to establish wireless communications, they use the same communication channels with different spatial information to be differentiated. The original communication channels are utilized with lower cost to reach the goal of a highly-efficient SDMA wireless communications system.

These skilled in the art will readily observe that numerous modifications and altercations of the device may be made while retaining the teaching of the invention. Accordingly, the above disclosure should be construed as limited only by the metes and bounds of the appended claims.

What is claimed is:

1. A communications system providing SDMA (spatial division multiple access) communication channels in a non-SDMA system and used in a communications area to effect wireless communications with a plurality of mobile stations in the area, the communication system comprising:

a smart antenna that uses a special spectrum to effect the wireless communications with the mobile stations in the communications area;

a base station controller that manages transmissions and passes information between every mobile station and an outgoing communications network;

a plurality of base transceiver stations electrically connected with the base station controller, each of the base transceiver stations effecting the wireless communications between the mobile stations and the base station controller;

a spatial spectrum management system connected between the smart antenna and the plurality of base transceiver stations, the spatial spectrum management system using the spatial spectrum from the smart antenna and choosing a set of communication channels from a plurality of predetermined communication channels according to the position of every mobile station to effect the wireless communications with the mobile stations in the communications area;

wherein the spatial spectrum management system uses the smart antenna to emit a plurality of spatial spectrums that are used to transmit the information by taking advantage of the same set of communication channels to respectively effect the wireless communications with the mobile stations and effect the wireless communications between mobile stations via different base transceiver stations and the base station controller to ensure that the wireless communications available to the mobile stations suffers no information interference conditions when the mobile stations in effectively different directions in the communications area are trying to simultaneously effect the wireless communications.

2. The communications system of claim 1 wherein the mobile stations in the communications area simultaneously effect the wireless communications, and the spatial spectrum management system uses the smart antenna to emit the spatial spectrums with different communication channels to effect the wireless communications with the mobile stations and avoid information interference of the wireless communications between the mobile stations and the smart antenna if the wireless communications of the mobile stations and the smart antenna are in almost the same direction.

3. The communications system of claim 1 wherein the spatial spectrum management system enables the mobile stations via a same or different base transceiver stations to effect the wireless communications with the base station controller.

4. The communications system of claim 1 wherein the smart antenna is a switched-beam smart antenna.

5. The communications system of claim 1 wherein the smart antenna is an adaptive-array smart antenna.

6. The communications system of claim 1 wherein the spatial spectrum management system comprises a spatial multiplexer/demultuplexer connected with the smart antenna to transmit the information received from mobile stations from every direction to corresponding base transceiver stations.

7. The communications system of claim 6 wherein the spatial multiplexer/demultiplexer comprises a beam controller connected with the smart antenna to control the spatial spectrums from the smart antenna and dynamically trace the positions of the mobile stations in the communications area.

8. The communications system of claim 7 wherein the spatial spectrum management system comprises a spatial channel management center to control both the spatial multiplexer/demultiplexer and the beam controller and to assign a set of communication channels to a mobile station that wants to effect wireless communications.

9. The communications system of claim 8 wherein the spatial spectrum management system comprises an interference measurement device used to determine occurrences of information interference in the wireless communications according to the spatial spectrums received from the smart antenna, and to transmit an index to the spatial channel management center to determine an assignment to a mobile station of another set of communication channels.

10. The communications system of claim 9 wherein the index is a bit error rate.

11. The communications system of claim 1 wherein the mobile stations are mobile phones.

12. A communications method for a communications system providing SDMA (spatial division multiple access) communication channels in a non-SDMA system, the communications method being used to effect wireless communications with a plurality of mobile stations in a communications area, the communications system comprising:

a smart antenna used to transmit and receive a plurality of spatial spectrums;

a base station controller that manages transmissions and passes information between every mobile station and an outgoing communications network; and a plurality of base transceiver stations electrically connected with the base station controller, each of the base transceiver stations effecting the wireless communications between the mobile stations and the base station controller;

the method comprising:

using the spatial spectrums transmitted and received by the smart antenna to trace the positions of the mobile stations in the communications area;

choosing a set of communication channels from a plurality of sets of predetermined communication channels to effect the wireless communications with the mobile stations according to the position of the mobile stations;

using the smart antenna to emit spatial spectrums used to transmit the information by taking advantage of the same set of communication channels to effect the wireless communications with the mobile stations and suffering no information interference conditions if mobile stations at different positions in the communications area simultaneously try to effect the wireless communications; and effecting the wireless communications between the mobile stations via different base transceiver stations and the base station controller to ensure that the wireless communications is available between the base station controller and the mobile stations.

13. The method of claim 12 wherein the mobile stations in the communications area effect the wireless communications at the same time, and the spatial spectrum management system uses the smart antenna to emit the spatial spectrums with different communication channels to effect the wireless communications with the mobile stations and avoid information interference of the wireless communications between the mobile stations and the smart antenna if the wireless communication between the mobile stations and the smart antenna are in nearly the same direction.

14. The method of claim 12 wherein the communications system enables the mobile stations via a same or different base transceiver stations to effect the wireless communications with the base station controller.

15. The method of claim 12 wherein the communications system comprises a spatial multiplexer/demultuplexer connected with the smart antenna to transmit information received from the mobile stations from every direction to corresponding base transceiver stations.

16. The method of claim 15 wherein the spatial multiplexer/demultiplexer comprises a beam controller connected with the smart antenna to control the spatial spectrums from the smart antenna and dynamically trace the positions of the mobile stations in the communications area.

17. The method of claim 16 wherein the communications system comprises a spatial channel management center to control both the spatial multiplexer/demultiplexer and the beam controller and to assign a set of communication channels to a mobile station that wants to effect wireless communications.

18. The method of claim 17 wherein the communications system comprises an interference measurement device used to determine occurrences of information interference in the wireless communications according to the spatial spectrums received from the smart antenna, and to transmit an index to the spatial channel management center to determine an assignment to a mobile station of another set of communication channels.

19. The method of claim 18 wherein the index is a bit error rate.

20. The method of claim 12 wherein the mobile stations are mobile phones.

* * * * *